Patented Nov. 1, 1949

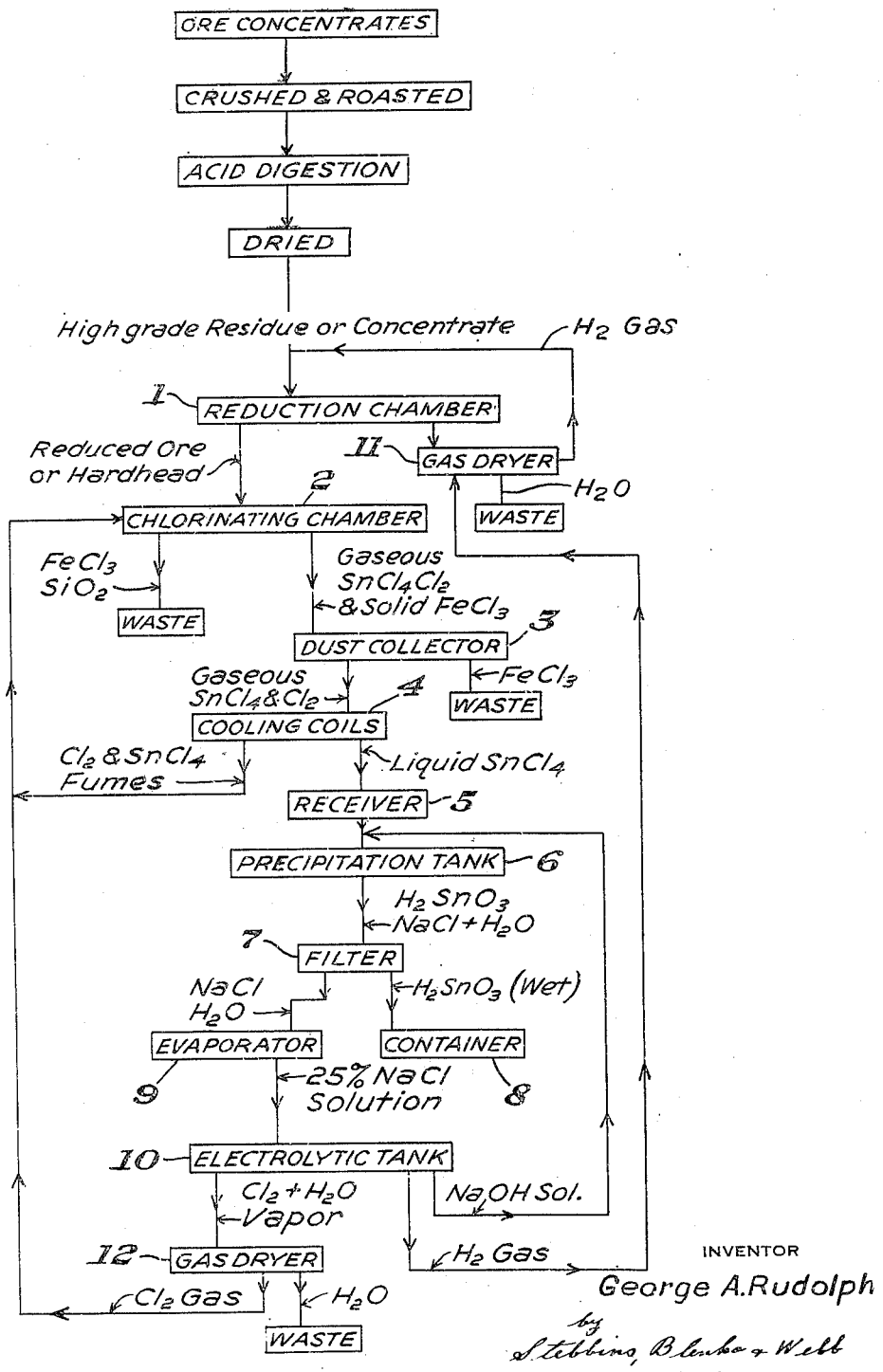

2,486,800

UNITED STATES PATENT OFFICE 2,486,800

PROCESS OF MAKING STANNIC ACID FROM TIN BEARING MATERIAL

George A. Rudolph, Youngstown, Ohio, assignor to The Youngstown Sheet and Tube Company, Youngstown, Ohio, a corporation of Ohio Application November 15, 1945, Serial No. 628,822

2 Claims. (Cl. 23—144)

This invention relates to a process of making stannic acid ($H_2SnO_3$) from tin-bearing materials or from tin oxide-bearing materials. The starting material may be tin oxide-bearing material, as for example, tin ores or tin ore concentrates. It may be the product known as hardhead, which is a by-product of tin smelting or of the hot dip tinning of steel. In "hardhead," the tin is present mainly in the form of metal rather than as oxide.

The accompanying drawing is a flow sheet illustrating my process.

There are three general grades of tin ore concentrates:

1. 50 to 60% tin—low in Fe, Sb, $SiO_2$, S.
2. 40 to 50% tin, with more of the impurities.
3. 18 to 35% tin—with high amounts of $SiO_2$, Fe, As, S.

The ore concentrates may be prepared for smelting in the following manner. They are crushed and roasted and then subjected to acid digestion to remove impurities. After filtering off the acid solution and drying the residue, a high grade residue or concentrate results. These steps may be in accordance with well-known commercial practice. Where the ore concentrate is of the type of grades 1 or 2 above, it may not be necessary to roast and treat the ores with acid in order to produce a suitable starting material for my process.

In accordance with my process, the high grade residue or tin ore concentrate is reduced from the oxide to the metallic state by hydrogen gas or other suitable reducing gas or mixture of reducing gases as for example a mixture of hydrogen and methane, the temperature preferably being between about 750° C. and 800° C. The reduction may be carried out in a reduction chamber designated by the reference numeral 1 in the accompanying drawing. The excess hydrogen from the reduction chamber 1 is freed from the water formed in the reduction step, ($SnO_2+2H_2=Sn+2H_2O$), by passing it through dryer 11 and is then returned to the system.

The reduced ore, or if hardhead is used, the hardhead is put in a chlorinating chamber 2 at room temperature and chlorine gas is passed through or over the material while slowly raising the temperature to preferably between about 270° C. and 298° C. Hardhead is usually composed of 75 to 85% tin, 15 to 25% iron and small amounts of lead, antimony, copper and arsenic. While this is the preferred range of temperature employed in the chlorinating chamber, any temperature may be employed which is high enough to vaporize the tin tetrachloride but is insufficient to vaporize ferric chloride. The preferred chlorinating treatment results in a mixture of gaseous tin tetrachloride, gaseous chlorine and solid particles of ferric chloride ($FeCl_3$) suspended in the gas.

The gaseous product containing solid particles of ferric chloride suspended in gaseous tin tetrachloride and chlorine is then passed into a dust collector 3, wherein the solid particles of ferric chloride are separated from the gases. In the dust collector the temperature is maintained above the boiling point of tin tetrachloride, (114° C.) so as to keep it in the vapor phase, but below the melting point of ferric chloride (282° C.). Preferably the temperature in the dust collector is kept between about 125° C. and 150° C.

The gases from the dust collector 3 are cooled by passing through cooling coils 4 which condenses the tin tetrachloride to the liquid state. The excess chlorine and any portion of the tin tetrachloride which remains uncondensed are returned to the system. The liquid tin tetrachloride is dissolved in water in receiver 5 and the solution is then passed into a precipitation tank 6, wherein sodium hydroxide solution or potassium hydroxide solution is added to precipitate stannic acid ($H_2SnO_3$). When sodium hydroxide is employed the reaction may be represented by the following equation:

$$SnCl_4+4NaOH=H_2SnO_3+4NaCl+H_2O$$

The precipitated stannic acid is filtered off on a filter 7 and removed to a container 8. The filtrate containing sodium chloride is passed to an evaporator 9 where it is evaporated to a concentration of about 25% NaCl which is a nearly saturated solution. From the evaporator the concentrated solution passes to an electrolytic tank 10 where it is subjected to electrolysis. The sodium hydroxide solution resulting from the electrolysis is returned to the precipitation tank 6 for precipitating a further quantity of tin tetrachloride. The hydrogen gas resulting from electrolysis is dried in the drier 11 and then returned to the reduction chamber 1 for reducing a further quantity of ore concentrates. The chlorine resulting from electrolysis is dried in a drier 12 and then returned to the chlorinating chamber 2 for chlorinating a further quantity of tin-bearing material.

Instead of passing hydrogen over the tin ore to reduce the ore and then passing chlorine over the metallic tin, it may be possible to burn the chlorine and hydrogen from the electrolytic tank 10 in the reduction chamber 1 to form HCl gas which at elevated temperature may form the desired tin tetrachloride.

The invention is not limited to the preferred embodiment, which has been given merely for purposes of illustration, but may be otherwise embodied or practiced within the scope of the following claims.

I claim:

1. The process of making stannic acid from tin and iron-bearing material, which comprises reacting the material with chlorine gas at a temperature of about 270–298° C., thereby forming a suspension of particles of ferric chloride in tin tetrachloride vapor, separating the particles of ferric chloride from the tin tetrachloride vapor while maintaining the temperature above the boiling point of tin tetrachloride but below the melting point of ferric chloride, dissolving the tin tetrachloride in water and reacting with alkali-metal hydroxide to precipitate stannic acid, and separating the stannic acid from the alkali-metal chloride solution.

2. The process of making stannic acid from tin and iron-bearing material, which comprises reacting the material with chlorine gas at a temperature of about 270° C. to 298° C., thereby forming a suspension of particle of ferric chloride in tin tetrachloride vapor, separating solid particles of ferric chloride from the tin tetrachloride vapor while maintaining the temperature at about 125° C. to 150° C., condensing the tin tetrachloride, dissolving the tin tetrachloride in water and reacting with alkali-metal hydroxide to precipitate stannic acid, and separating the stannic acid from the alkali-metal chloride solution.

GEORGE A. RUDOLPH.

REFERENCES CITED

The following references are of record in the file of this patent:

UNITED STATES PATENTS

| Number | Name | Date |
|---|---|---|
| 877,261 | Townsend | Jan. 21, 1908 |
| 1,931,944 | Wood et al. | Oct. 24, 1933 |

FOREIGN PATENTS

| Number | Country | Date |
|---|---|---|
| 309,307 | Great Britain | Apr. 11, 1929 |
| 364,663 | Great Britain | Jan. 4, 1932 |
| 406,300 | France | Dec. 4, 1908 |

OTHER REFERENCES

Mellor, Inorganic and Theoretical Chemistry, vol. 7, p. 407; pub. in 1927 by Longmans, Green and Co., London.

Babor et al., General College Chemistry, 2nd Edition, pp. 310, 312, and 313; pub. in 1940 by Thomas Y. Crowell Co., N. Y.